May 3, 1927.          L. A. FOWLER          1,626,607
BRAKE VALVE DEVICE
Filed Aug. 6, 1925
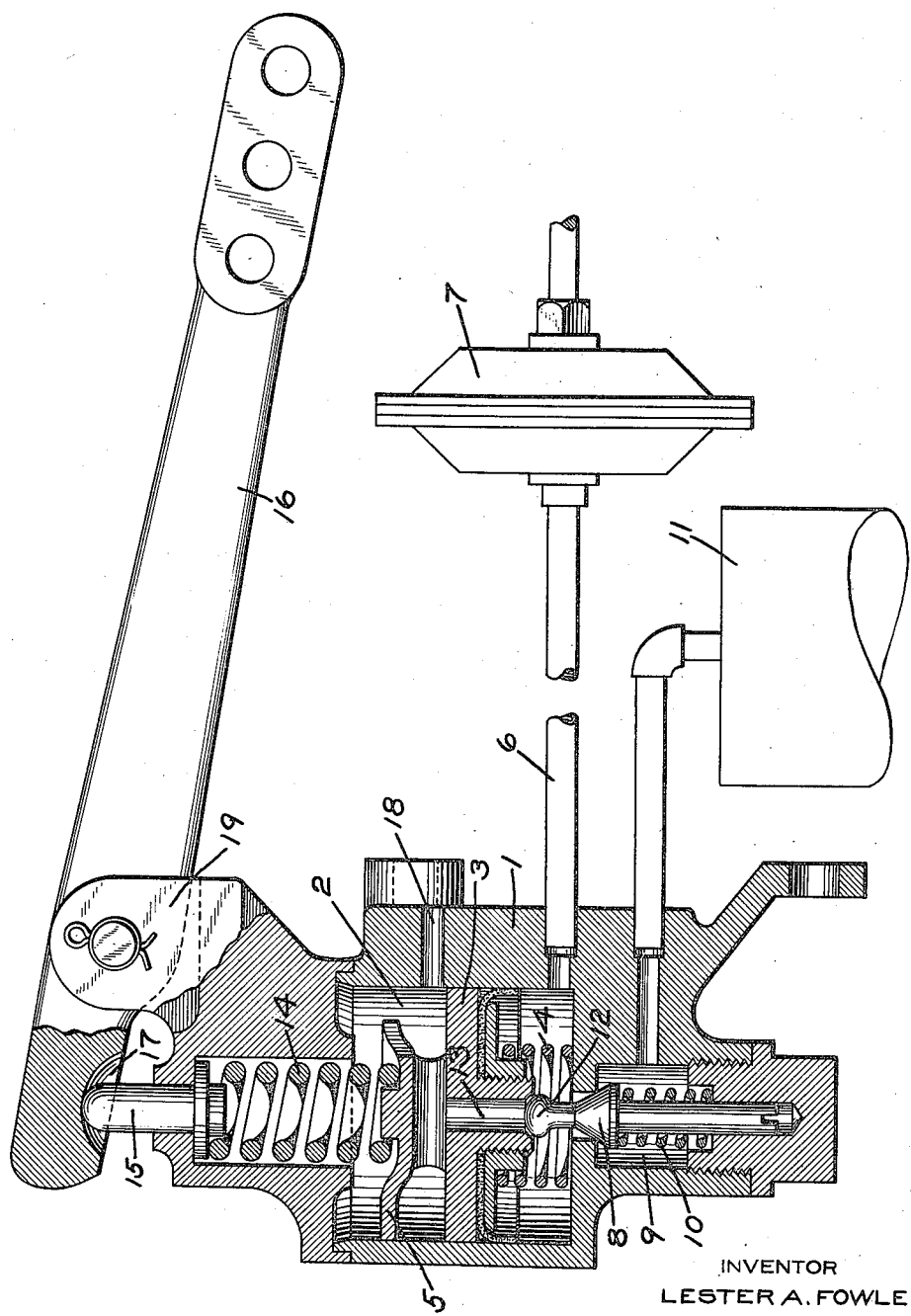
INVENTOR
LESTER A. FOWLER
BY *Wm. M. Cady*
ATTORNEY Patented May 3, 1927.

1,626,607

UNITED STATES PATENT OFFICE.

LESTER A. FOWLER, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed August 6, 1925. Serial No. 48,441.

This invention relates to fluid pressure brakes and to a brake valve device adapted more particularly to be used in connection with automotive fluid pressure brakes.

The principal object of my invention is to provide an improved brake valve device of the above character.

In the accompanying drawing, the single figure is a view, partly in section, showing a brake valve device embodying my invention, and shown associated with a brake chamber and a reservoir.

As shown in the drawing, the brake valve device may comprise a casing 1 having a piston chamber 2 containing a piston 3 having guide wings 5 and subject on one side to the pressure of a coil spring 4 and having the chamber at the opposite side open to an atmospheric exhaust port 18. The piston chamber 2 at the spring side of piston 3 is connected through a pipe 6 with a brake chamber 7, an increase in fluid pressure in which is adapted to effect an application of the brakes.

A supply valve 8 contained in valve chamber 9 is disposed in axial alinement with piston 3 and is subject on one side to the pressure of a coil spring 10, said valve being adapted to control communication from a reservoir 11 to piston chamber 2 and the brake chamber 7. Integrally connected with the supply valve 8 is a ball shaped exhaust valve 12 adapted to control the exhaust of fluid from the brake chamber 7 by engaging a seat surrounding an exhaust port 13 which extends through the piston 3, said valve being made ball-shaped in order to compensate for any inaccuracies in alinement between the valve and the piston and thus ensure a tight seat.

Engaging the piston 3 is a coil spring 14, and applied to the outer end of the spring is a spring stem 15 which extends out through the casing 1. Pivotally mounted on a lug 19 is a lever 16, one end of which is provided with a concave recess 17 adapted to receive the projecting convex end of spring stem 15, while the opposite end of said lever arm is suitably connected to a hand or foot operated device (not shown), which is within easy reach of the operator.

When it is desired to effect an application of the brakes, the lever arm 16 is operated to compress the spring 14, which acts to shift the piston 3 so as to cause the ball shaped exhaust valve 12 to first seat against the valve seat surrounding passage 13, and then upon a further movement the supply valve 8 is unseated. Fluid under pressure from the reservoir 11 then flows past unseated valve 8 and through pipe 6 to brake chamber 7. When the pressure of fluid in the brake chamber and on the piston 3 has increased to a degree slightly greater than the pressure exerted by spring 14 on the opposite side of said piston, the piston will be shifted so as to permit the supply valve 8 to be seated by spring 10 and still maintain the ball-shaped exhaust valve seated, closing exhaust passage 13.

When it is desired to release the brakes, the lever arm 16 is operated so that the pressure on spring 14 is relieved, which permits the pressure of fluid in the brake chamber and the pressure exerted by spring 4 to shift the piston 3, so that the exhaust valve 12 will be unseated. Fluid from the brake chamber then flows through pipe 6, passage 13, and to atmosphere through atmospheric exhaust port 18.

It will be evident that the brakes may be gradually applied or released as desired by gradually increasing or diminishing the force applied to the spring 14 by the movement of lever arm 16.

Any tendency of the spring stem 15 to cock, when pressure is applied to the lever arm 16, is prevented by the ability of the rounded end of the stem to readily slide on the concave surface of the recess 17.

Having now described my invention, what I claim as new and desire to secure by Letters Patent, is:—

1. In a fluid pressure brake, the combination with a brake chamber, of a brake valve device comprising a casing, a piston in said casing having the chamber at one side connected to the brake chamber and the chamber at the opposite side connected to the atmosphere and having an exhaust passage, a supply valve for controlling the supply of fluid under pressure to said brake chamber, and a ball-shaped exhaust valve associated with said supply valve and controlling communication through said exhaust passage.

2. In a fluid pressure brake, the combination with a brake chamber, of a brake valve device comprising a casing, a ball-shaped exhaust valve for controlling communication through said exhaust passage and operable by said piston, and a supply valve movable with said exhaust valve for controlling the supply of fluid under pressure to said brake chamber.

In testimony whereof I have hereunto set my hand.

LESTER A. FOWLER.